United States Patent [19]

Varadaraj et al.

[11] Patent Number: 5,851,432

[45] Date of Patent: Dec. 22, 1998

[54] TRIPLE TAIL SURFACTANT FORMULATIONS FOR EMULSIFICATION OF HEAVY HYDROCARBONS

[75] Inventors: Ramesh Varadaraj, Flemington; Max Leo Robbins, South Orange; Salvatore James Pace, Milford, all of N.J.

[73] Assignee: Exxon Research and Engineering Company, Florham Park, N.J.

[21] Appl. No.: 822,381

[22] Filed: Mar. 20, 1997

[51] Int. Cl.$^6$ .................................................. B01J 13/00

[52] U.S. Cl. ........................ 252/314; 252/311.5; 252/312; 252/351

[58] Field of Search ..................... 252/312, 314, 252/311.5, 351; 137/13; 510/417

[56] References Cited

U.S. PATENT DOCUMENTS

| | | | |
|---|---|---|---|
| 2,978,418 | 4/1961 | Parker, Jr. | 252/312 |
| 3,101,301 | 8/1963 | Siegal et al. | 252/312 X |
| 3,425,429 | 2/1969 | Kane | 137/13 |
| 3,625,857 | 12/1971 | Weimer et al. | 252/312 |
| 3,926,203 | 12/1975 | Marsden, Jr. et al. | 137/13 |
| 4,502,962 | 3/1985 | Becker et al. | 252/314 X |
| 4,949,743 | 8/1990 | Broom | 137/13 |
| 5,051,192 | 9/1991 | Charlier | 252/312 X |

*Primary Examiner*—Richard D. Lovering
*Attorney, Agent, or Firm*—Gerard J. Hughes

[57] ABSTRACT

A triple tail surfactant composition useful in emulsifying viscous hydrocarbon with water is disclosed. The composition includes an organic solvent and at least one triple tail surfactant represented by the formulae $$\{R(OCH_2CH_2)_n\}_3PO_4$$

and

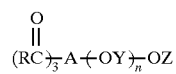

where R is where R is an alkyl group of from about 6 to about 20 carbon atoms; A is a polyhydric alcohol radical, especially a hexitol radical; Y an alkenyl group of from 2 to about 4 carbon atoms; n is an integer of from 0 to 25; and Z is —H, —SO$^-_3$M$^+$, —SO$^-_2$M$^+$, or —PO$^-_3$M$^+$ where M is an alkali metal.

1 Claim, No Drawings

TRIPLE TAIL SURFACTANT FORMULATIONS FOR EMULSIFICATION OF HEAVY HYDROCARBONS

FIELD OF THE INVENTION

The present invention relates to surfactant formulations and their use in creating oil in water emulsions and especially emulsions of heavy hydrocarbons in water.

BACKGROUND OF THE INVENTION

Transportation and processing of crude oils that are viscous or have low API gravity are problematic. Numerous approaches have been proposed and investigated to address the problem. These including heating, dilution with a less viscous crude oil distillate and the formation of oil in water emulsions. Although each one of these approaches are viable there still remains a need to improve the efficiency and cost effectiveness of these technologies.

The present invention relates to emulsification of viscous hydrocarbons in water. As is known in the art, in order to emulsify oil in water there is a need for emulsifiers and a device that provides appropriate mixing.

The principal object of this invention is to provide emulsifier formulations that are particularly effective in emulsifying viscous crude oils in water. It is another object of this invention to use the formulations to form the desired emulsion with equal effectiveness in both fresh and sea waters. Still another object of this invention is to provide a method to use the emulsifier formulation wherein the mixing energy required for the formation of the emulsion is low relative to that known in the art.

Generally, surfactants are used as emulsifiers. A surfactant molecule is characterized by the presence of a hydrophobic group, e.g., a long chain hydrocarbon (tail) attached to a hydrophilic group (head). The hydrophilic head group can be an anionic, cationic or non ionic and accordingly, surfactants are classified as anionic, cationic or nonionic. The vast majority of synthetic surfactants known in the art are molecules with one long hydrocarbon chain attached to one head group. Variations reported in the art include branched hydrocarbon chains and fluorocarbon chains as tails. Surfactant molecules with three hydrocarbon chains attached to one or more head groups, hereinafter called triple tail surfactants, are relatively rare.

Research has now resulted in certain triple tail surfactant formulations that are effective in creating oil in water emulsions of viscous hydrocarbons such as, bitumen.

SUMMARY OF INVENTION

In one embodiment of the invention the emulsification of a viscous hydrocarbon is achieved by mixing the viscous hydrocarbon with water and a composition comprising (i) an organic solvent, (ii) at least one triple tail surfactant selected from triple tail surfactants represented by the formulae

and

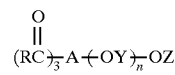

where R is an alkyl group of from about 6 to about 20 carbon atoms; A is a polyhydric alcohol radical, especially a hexitol radical; Y an alkenyl group of from 2 to about 4 carbon atoms; n is an integer of from 0 to 25; and Z is —H, —SO$^-_3$M$^+$, —SO$^-_2$M$^+$, or —PO$^-_3$M$^+$ where M is an alkali metal.

In a preferred embodiment of the present invention, the method to create an oil in water emulsion involves first mixing the above described solvent and surfactant containing composition with the viscous hydrocarbon to provide a treated hydrocarbon and then mixing the treated hydrocarbon with water in an amount sufficient to form a hydrocarbon in water emulsion.

These and the preferred embodiments will be discussed in detail below.

DETAILED DESCRIPTION OF THE INVENTION

Viscous hydrocarbons such as viscous crude oils, crude oil distillate fractions or distillation resids typically having a viscosity greater than about 500 centistokes at 25° C. are emulsified by mixing the viscous hydrocarbon and water with a triple tail surfactant formulation of the present invention. The formulation comprises (i) an organic solvent and (ii) at least one triple tail surfactant selected from triple tail surfactants represented by the formulae

and

where R is an alkyl group of from about 6 to about 20 carbon atoms; A is a polyhydric alcohol radical, especially a hexitol radical; Y an alkenyl group of from 2 to about 4 carbon atoms; n is an integer of from 0 to 25; and Z is —H, —SO$_3^-$M$^+$, —SO$_2$M$^+$, or —PO$^-_3$M$^+$ where M is an alkali metal.

In the practice of the present invention, it is preferred that the alkyl groups, i.e., R in the above formulae, have the same number of carbon atoms.

The surfactant composition of the invention may be further augmented with quantities of single tail surfactant, a twin tail surfactant or mixtures thereof. Generally, 40 to 100% by weight of the surfactant content of the composition will be triple tail surfactants with the remaining wt %, if any, augmented by single and twin tail surfactants. The chain length of the single and twin tail augmenting surfactants need not match the chain length of the triple tail surfactants.

In general, the solvent used to dissolve the surfactants is a normal or branched aliphatic hydrocarbon having from 6 to 16 carbon atoms, although hydrocarbons such as tetralin, cycloalkanes, aromatic hydrocarbons, alkyl substituted aromatic hydrocarbons, terpenes, alcohols, and mixtures of these solvents may be employed.

Typically, the total surfactants in the composition will constitute from about 25 to 75 wt % of the total weight of the composition with the remainder being the solvent.

In the practice of the invention, the triple tail surfactant formulation is mixed in a first step with the viscous hydrocarbon at temperatures in the range of about 10° C. to about 400° C. and at a treat rate in the range of 5 to 20 wt % based on the weight of the hydrocarbon. The so treated hydrocarbon is then added to water at an oil water ratio of 1:3 to 1:15. The water may contain from 0 wt. % to 6 wt. % monobasic and dibasic salts like NaCl, KCl, CaCl$_2$, MgCl$_2$ and the like. In any event, the treated oil and water are mixed in a second step at a temperature in the range of about 10° C. to about 75° C. to create the oil in water emulsion.

Mixing in each step can be effected by any conventional mixing device such as rotating impellers, turbines and interfacial surface generators. The preferred mixing of the treated oil and water is by any apparatus that provides a continuous swirling motion.

The following examples illustrate the invention.

EXAMPLES 1 and 2

Formulation Preparation: A triple tail surfactant formulation (formulation A) was prepared using 50 wt % Tween-85 and 50 wt % Norpar-13.

Tween 85, sold by ICI Americas, Wilmington, Del. is the trade name for a triple tail surfactant of the general formula

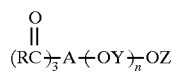

where R is an alkyl group of 18 carbon atoms, A is a sorbitol radical, Y is $CH_2CH_2$, n is 15 and Z is —H. Norpar-13 is a tradename for a relatively narrow boiling range paraffin solvent sold by Exxon Company USA, Houston, Tex. that contains greater than 98 wt % normal paraffins.

For purposes of comparison, two formulations, Formulation B and Formulation C, were prepared with 50 wt % single tail sorbitol surfactants and 50 wt % Norpar-13. The single tail surfactants had a comparable hydrophilic lipophilic balance (HLB) to Formulation A.

Formulation Effectiveness Testing Procedure: A series of runs were conducting by premixing Bunker C oil (viscosity of 4,500 centipoise at 25° C.) with one of the formulations at a formulation to oil ratio of 1:10. Then 150 ml of water was placed in 300 ml 4-baffled bottom flask and 0.533 g of treated oil was added to the flask. The flask was placed on an orbital shaker and shaken at 125 rpm (for sea water) and 150 rpm (for fresh water) for 45 minutes. After mixing for 45 minutes the contents of the flask were transferred to a 250 ml separator funnel to allow the undispersed droplets to coalesce. The contents were immediately withdrawn up to the coalesced oil. The withdrawn dispersed phase was analyzed for percent dispersion and mean droplet size by a Coulter Counter technique using a Coulter Multisizer II instrument.

Results of the experiment shown in Table-1 illustrates the superior performance of a triple tail surfactant of the current invention over the single tail surfactants known in the art. Additionally, the results also demonstrate its performance is insensitive to salt concentration in water.

TABLE 1

| Example | Formulation | Surfactant | Water | % Dispersed | Mean Droplet Diameter (microns) |
|---|---|---|---|---|---|
| 1 | A | triple tail | fresh | 100 | 23 |
| 2 | A | triple tail | sea | 90 | 17 |
| Comparative | B | single tail | sea | 22 | 29 |
| Comparative | C | single tail | sea | 6 | 38 |

EXAMPLES 3 and 4

The performance of the triple tail formulation (A) of Examples 1 and 2 on Cold Lake bitumen (54,000 cP viscosity at 25° C.) in both sea and fresh waters was determined using the Formulation Effectiveness Testing Procedure described in Examples 1 and 2 above. The results show in Table-2 indicate excellent emulsification performance. The performance of formulation A on Cold Lake bitumen is similar to that on Bunker C oil despite its viscosity being an order of magnitude greater.

TABLE 2

| Example | Formulation | Surfactant | Water | % Dispersed | Mean Droplet Diameter (microns) |
|---|---|---|---|---|---|
| 3 | A | triple tail | sea | 78 | 18 |
| 4 | A | triple tail | fresh | 100 | 18 |

What is claimed is:

1. A method for forming an emulsion of viscous hydrocarbon in water comprising:

(a) mixing a viscous hydrocarbon with a composition containing (i) an organic solvent and (ii) at least one triple tail surfactant represented by the formula $$\{R(OCH_2CH_2)_n\}_3PO_4$$

where R is an alkyl group of from about 6 to about 20 carbon atoms and n is an integer of from 0 to 25 to form a treated hydrocarbon and then:

(b) mixing the treated hydrocarbon with water in an amount sufficient to form a hydrocarbon in water emulsion,
   wherein the mixing of step (a) is at a temperature in the range of about 10° C. to about 400° C.,
   wherein the mixing of step (b) is conducted at a temperature in the range of about 10° C. to 75° C., and
   wherein the composition of step (a) contains 25 wt. % to 75 wt. % of surfactants, the balance being solvent.

* * * * *